P. PHILIPPI.
Fastening for Gate.
No. 58,130.  Patented Sept. 18, 1866.
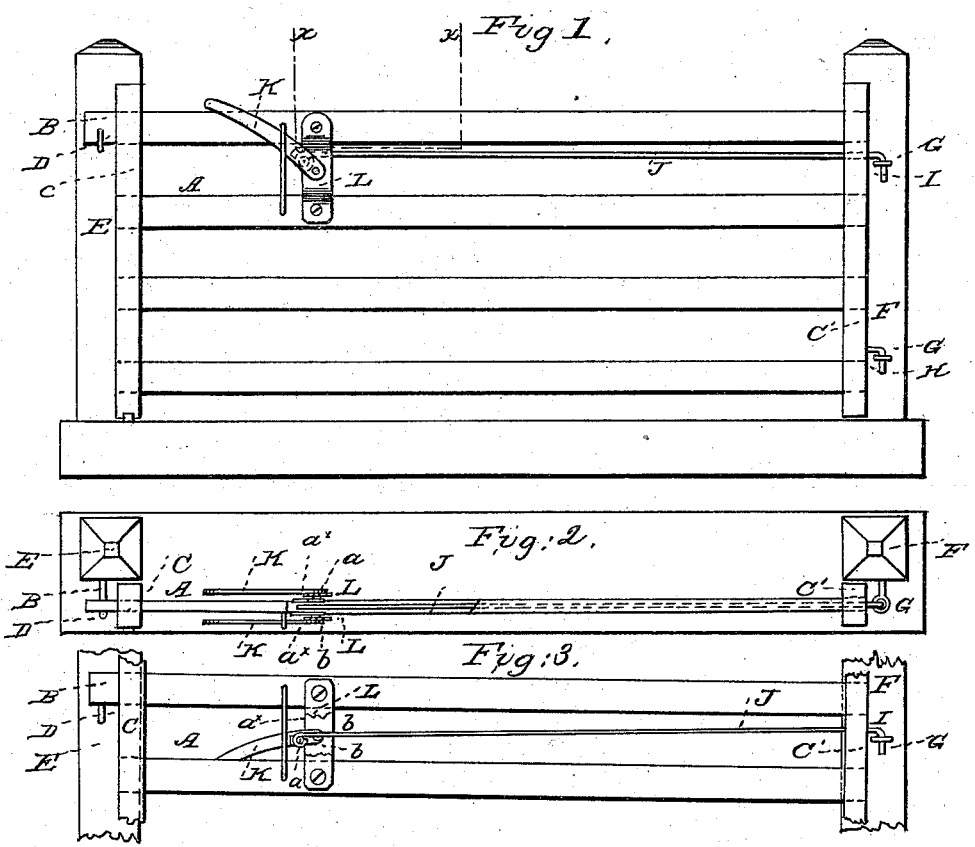

UNITED STATES PATENT OFFICE.

POMPEIUS PHILIPPI, OF BEARDSTOWN, ILLINOIS.

IMPROVEMENT IN FASTENINGS FOR GATES.

Specification forming part of Letters Patent No. 58,130, dated September 18, 1866.

*To all whom it may concern:*

Be it known that I, POMPEIUS PHILIPPI, of Beardstown, in the county of Cass and State Illinois, have invented a new and Improved Fastening for Gates; and I do hereby declare that the following is a full, clear, and exact description thereof, which will enable those skilled in the art to make and use the same, reference being had to the accompanying drawings, forming part of this specification, in which—

Figure 1 is a side view of a gate with my invention applied to it, the gate being in a fastened state; Fig. 2, a plan or top view of the same, the gate being partly in section, as indicated by the line $x\ x$, Fig. 1; Fig. 3, a side view of a portion of the same in an unfastened state.

Similar letters of reference indicate corresponding parts.

This invention consists in having the upper bar of the gate extended a suitable distance beyond the batten or upright at its free or unhinged end, or having a bar extend from said batten or upright to catch into or over a hook attached to the gate-post, and using in connection therewith a lever or levers and a rod arranged in such a manner that by adjusting or operating the levers the unhinged end of the gate may be raised and lowered with the greatest facility and the projecting bar made to catch into the hook or be raised out of it in order to fasten or unfasten the gate, as may be required.

A represents a gate, which may be constructed in any proper manner, and with a bar, B, projecting horizontally from the batten or upright C at its free or unhinged end, to fit into a hook, D, in the post E when the gate is closed. The opposite end of the gate is hinged to the other post, F, of the gate as follows: In the post F two staples or eyes, G G, are driven, one above the other, and at a distance apart according to the height of the gate. In the lower staple or eye, G, a hook, H, is fitted, which projects from the lower part of the batten or upright C' at the rear end of the gate.

The hook I, which fits in the upper staple or eye G, is formed at the outer end of a rod, J, which passes horizontally through the upright C', and is connected at its inner end to a rod, $a$, between two plates, $a^\times\ a^\times$, attached to the inner sides of two levers, K K, which are connected by a fulcrum-pin, $b$, to two plates, L L, secured one to each side of the gate.

By this arrangement it will be seen that by pressing the levers K—either one of them—downward their action upon the rod J will be such as to elevate the unhinged end of the gate and raise the bar B out from and above the hook D, as shown in Fig. 3, and admit of the gate being opened; and by raising said levers the unhinged end of the gate may be lowered and the bar B fitted in hook D, when the gate is closed, as shown in Fig. 1.

Thus, by this simple means, an excellent gate-fastening is obtained, and one by which the annoyance occasioned by the sagging of the gate—a frequent contingency—is entirely avoided, as the unhinged end of the gate, in order to release it, is elevated from the ground to admit of it being opened.

Having thus described my invention, I claim as new and desire to secure by Letters Patent—

The arrangement of the hooked rod J and lever K, in combination with the bar B, posts E F, and pin D, constructed and operating in the manner and for the purpose herein specified.

POMPEIUS PHILIPPI.

Witnesses:
SAMUEL FULKS,
HENRY MENKE.